Figure 4:
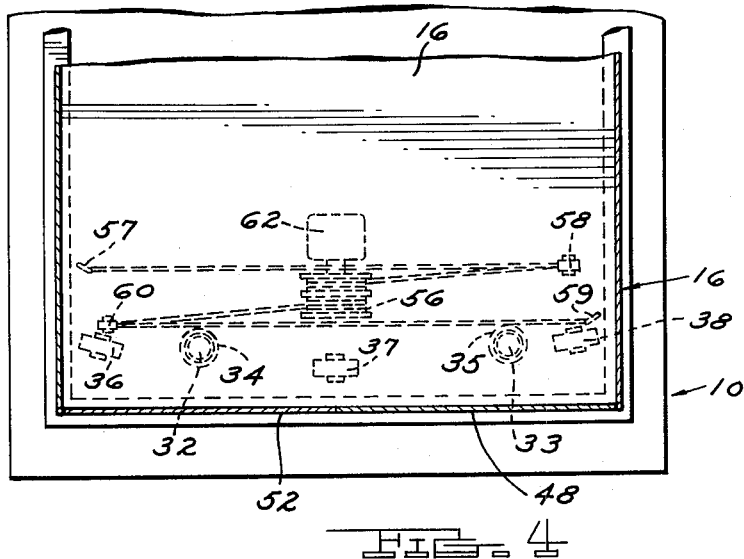

Dec. 28, 1965 L. M. FRANCIS 3,225,709
END LOADING CARGO VEHICLE
Filed June 20, 1962 3 Sheets-Sheet 1
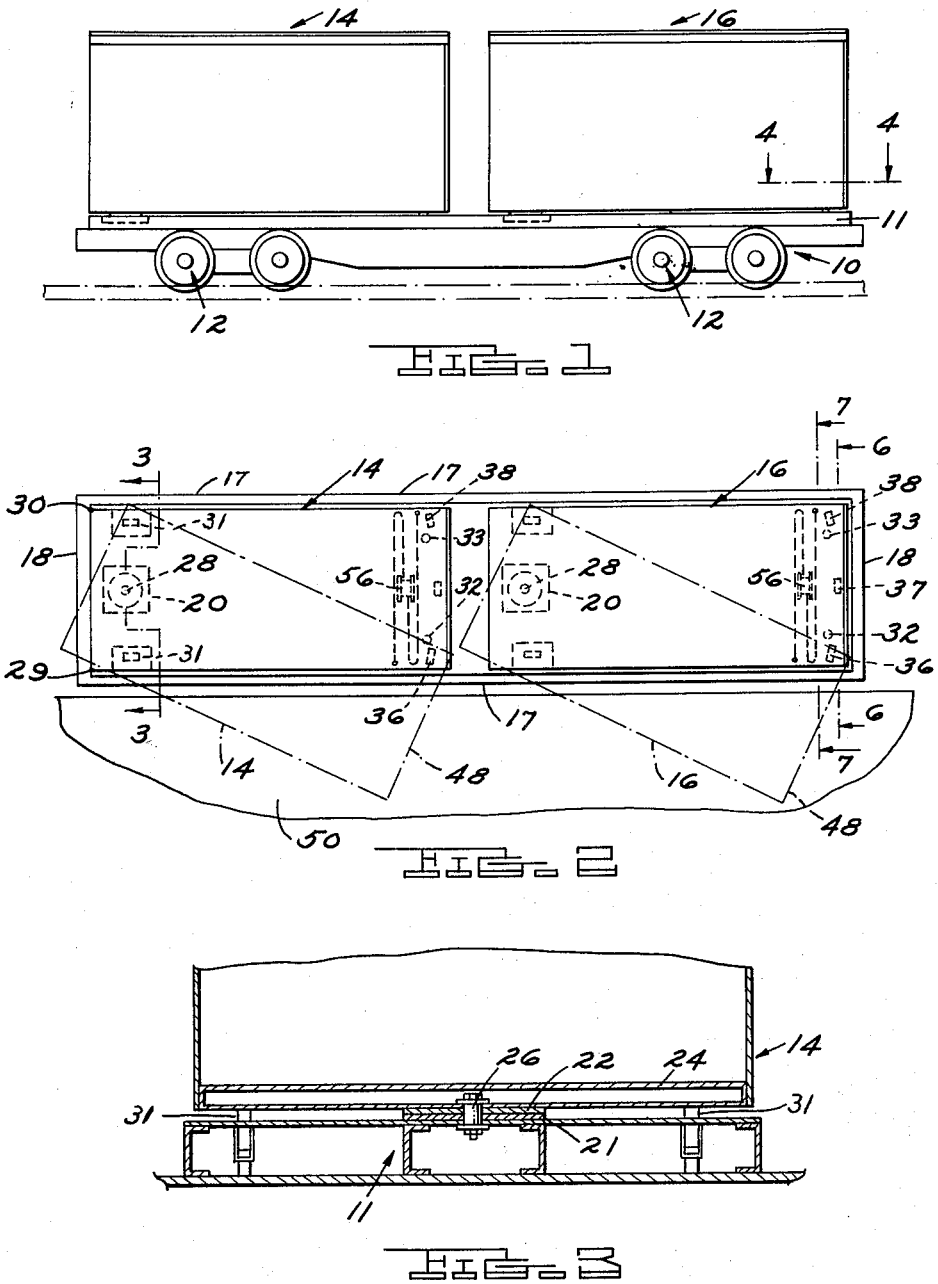
INVENTOR.
LYNN M. FRANCIS
BY
Farley Forster + Farley
ATTORNEYS Dec. 28, 1965 L. M. FRANCIS 3,225,709
END LOADING CARGO VEHICLE
Filed June 20, 1962 3 Sheets-Sheet 2

INVENTOR.
LYNN M. FRANCIS
BY
Farley Forster & Farley
ATTORNEYS

Dec. 28, 1965 L. M. FRANCIS 3,225,709
END LOADING CARGO VEHICLE
Filed June 20, 1962 3 Sheets-Sheet 3

INVENTOR.
LYNN M. FRANCIS
BY
Farley Forster &Farley
ATTORNEYS

United States Patent Office 3,225,709
Patented Dec. 28, 1965

3,225,709
END LOADING CARGO VEHICLE
Lynn M. Francis, 21611 Raymond,
St. Clair Shores, Mich.
Filed June 20, 1962, Ser. No. 203,882
2 Claims. (Cl. 105—455)

This invention relates to an improved construction for a vehicle such as a railroad car of the type having a cargo container which can be moved out of a position of longitudinal alignment with the vehicle to permit the loading and unloading of cargo through an opening at one end of the container from a loading dock or area alongside of the vehicle.

The time required to load and unload many types of cargo from conventional side door box cars is materially increased because of the difficulty in maneuvering a load through the door and moving it to one end of the car or the other end. Only one end of the car can be loaded at a time, and after the load is built up from the ends toward the middle, the placing of the last portion of the load in the door area part of the car is in many cases not easy either. Special dunnage is frequently required. Loading and unloading would be facilitated if the loading opening were at one end of the car.

The present invention provides a freight car construction which permits a great reduction in loading and unloading time by employing two cargo containers for a regular freight car. Normally these containers are carried by the car frame in end-to-end relation within the dimensions of the sides and ends of the car, but for loading or unloading the containers are mounted by suitable means so that they may each be swung to an angular position in which one end of the container, provided with a loading opening, extends out to one side of the car over a conventional loading dock. In the preferred arrangement this permits simultaneous access to the loading opening of both containers which, in combination with the advantages of endwise loading, greatly facilitates the operation regardless of the type of cargo.

The car is constructed with a bed or frame on which the cargo containers are supported, being connected to the frame by pivot means located adjacent one end of each container to define a vertical axis about which the container may be swung from normal to loading position. Thus pivot means is also constructed to permit limited rocking movement of the container relative to the car frame in a direction transverse to the pivot axis, and the pivot axis is located relative to the frame and container so that the distance from the axis to either corner of the container closest thereto is substantially equal to the distance from the axis to the side of the car closest to each such corner. As a result, the container may be moved to angular loading position, exposing the loading opening in the end thereof opposite to the end pivotally connected to the frame, without causing any objectionable reduction in the clearance between the car being loaded and a car on an adjacent track, which clearance is frequently very small at loading docks.

The loading or swinging end of each container, as distinguished from the pivoted end thereof, is normally supported on the frame by means which fixes the container in longitudinally aligned relation with the frame. Roller supporting means are also provided for the loading end, being interposed between the frame and underside of the container, and the fixed and roller supporting means are relatively movable vertically so as to shift the container from one to the other, thereby releasing the container from fixed position and permitting it to be swung about the pivot axis on the roller supporting means to a loading position and return. Some suitable power actuated device is provided for relatively moving the fixed and roller supporting means and a power actuated device is also preferably provided for producing swinging movement of the container about its pivot axis.

Figure 5:
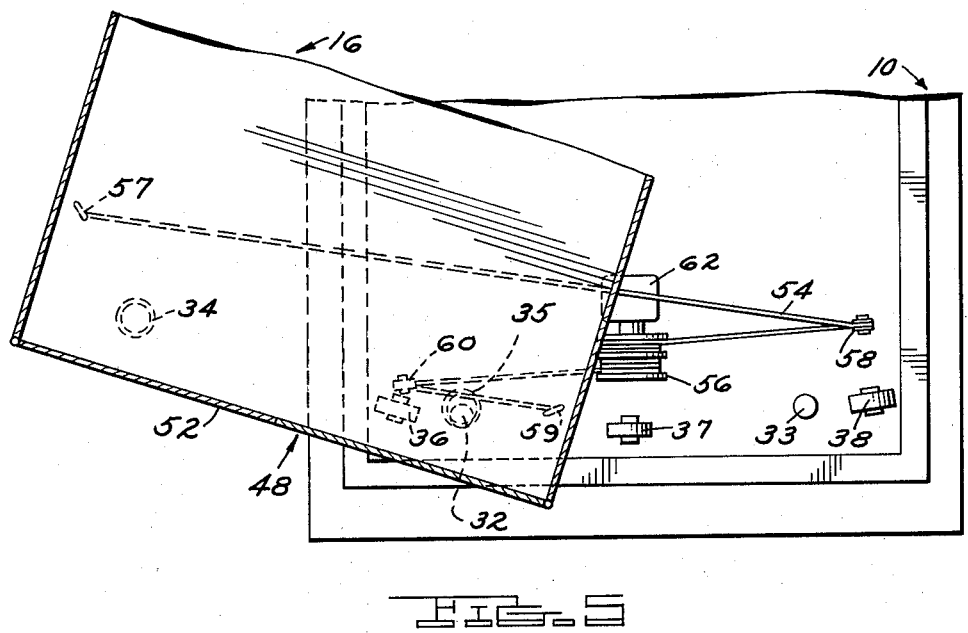
Figure 6:
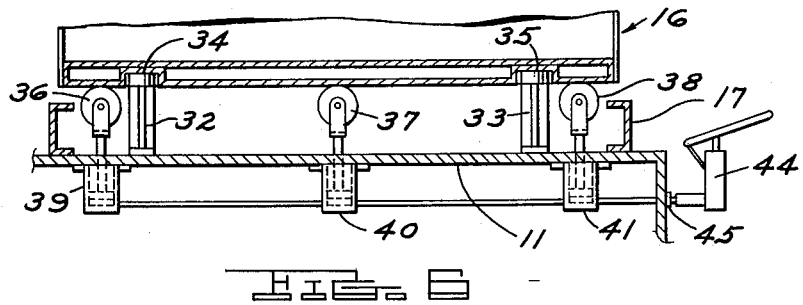
Figure 7:
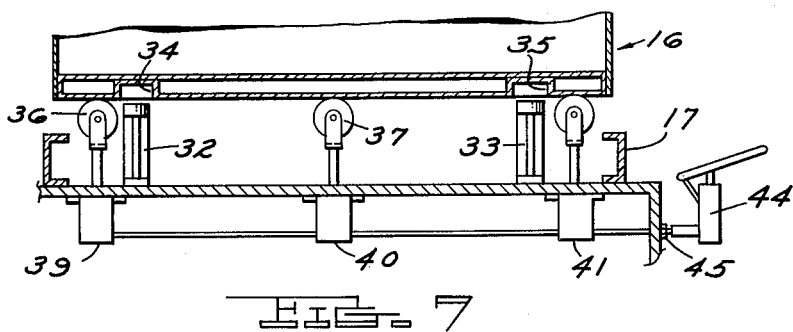
Figure 8:
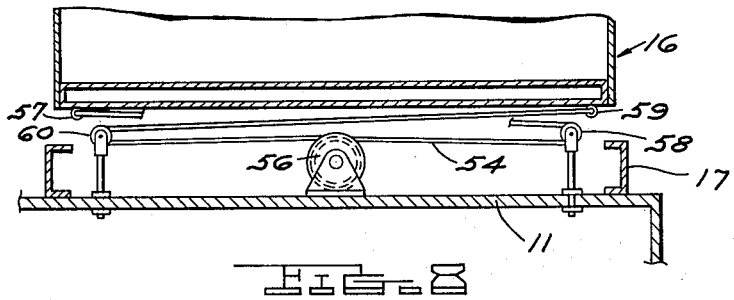
Figure 9:
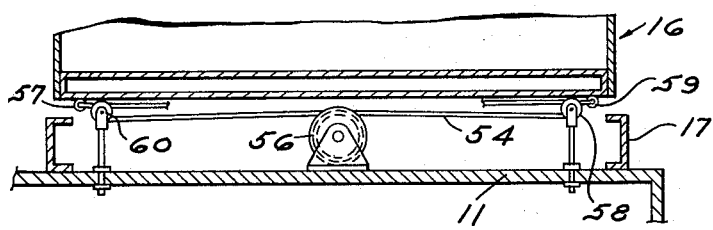

The invention will be further described by the representative embodiment thereof disclosed in the accompanying drawings which consist of the following views:

FIGURE 1, a side elevation of a railroad freight car equipped with a pair of movable containers;

FIGURE 2, a plan view of the car shown in FIG. 1 illustrating the loading or unloading position of the containers in phantom line;

FIGURE 3, a fragmentary sectional elevation on an enlarged scale taken at indicated by the line 3—3 of FIG. 2;

FIGURE 4, an enlarged sectional plan view taken as indicated by the line 4—4 of FIG. 1 showing the container in normal position;

FIGURE 5, a view similar to FIG. 4 but showing the container in a position intermediate the normal and loading position thereof;

FIGURE 6, an enlarged fragmentary sectional elevation taken as indicated by the line 6—6 of FIG. 2 and showing the container resting on fixed supports;

FIGURE 7, a view similar to FIG. 6 but showing the container resting on a plurality of roller supports;

FIGURE 8, a similar sectional elevation but taken as indicated by the line 8—8 of FIG. 2 showing the container in the position of FIG. 7; and FIGURE 9, a view similar to FIG. 8 but showing the container in the position similar to FIG. 6.

The railroad car 10 includes suitable frame structure 11, supported by conventional wheel trucks 12, on which a permanent body consisting of a pair of cargo containers 14 and 16 are mounted in a normal end-to-end relation in which the containers lie within the sides 17 and ends 18 of the car, as best shown in FIG. 2.

The mounting means consists of a pivotal connection 20 employed to secure one end of each container to the frame end shown in FIG. 3. This connection includes a pair of sliding plates, one, 21, secured to the frame structure 11, and the other, 22, secured to the under structure 24 of a container, the plates 21 and 22 being connected together by a king pin 26 which defines a vertical pivotal axis, and enough clearance is provided in this connection to permit a limited rocking movement of the container in a direction transverse to the axis. As shown in FIG. 2, the axis 28 of the pin 26 is located so that the distance from the axis to either corner 29 or 30 of the container adjacent thereto is preferably not in excess of the distance from the axis to the side 17 of the car adjacent either of the corners 29 or 30.

A roller 31 is preferably mounted on the frame structure 11 to each side of the pin 26 and transversely of the car to assist in supporting the pivoted end of each container and to restrain transverse rocking movement of a container about the pivot axis.

The other end of each container is supported as best shown in FIGS. 6 and 7. Fixed supporting means in the form of a pair of vertical posts 32 and 33 are carried by the car frame structure 11 and engage sockets 34 and 35 in the container underbody when the container is longitudinally aligned with the car frame. A plurality of roller supports 36, 37 and 38 are carried by the frame adjacent the fixed supports 32 and 33. One of these supports, in this case the roller supports, is mounted for vertical movement relative to the fixed supports, the roller supports being each secured to actuating cylinders 39, 40 and 41 so that the roller supports can be raised by fluid pressure supplied to the cylinder by suitable means such as the pump 44. A plug-in connection 45 may be provided on the car structure so that the pump 44 may be disconnected when not used. When pressure is supplied to the cylinders 39–41, the roller supports 36–38 are raised as shown in FIG. 7, and by reason of the limited rocking movement permitted by the pivotal connection, as previously described, the container can be lifted out of engagement with the fixed supports 32 and 33 and its weight transferred to the roller supports.

Power operated means shown in FIGS. 4, 5, 8 and 9 are provided for swinging the container about the king pin 26 from the longitudinally aligned position relative to the frame to an angular position shown in phantom in FIG. 2 in which the loading end 48 of each container extends over the surface 50 of a loading dock, and when conventional doors 52, provided in the container ends 48 are opened, the containers 14 and 16 may be loaded or unloaded simultaneously. The means for swinging the container consists of a cable 54 having its intermediate portion trained about a winch 56. One end 57 of the cable is passed about a sheave 58 secured to the car frame and attached to the understructure of the container on the side opposite from the sheave 58. The other end of the cable 54 is similarly trained about a sheave 60 and secured to the other side of the container. Winch 56 is driven by some suitable device 62.

While preferred embodiments have been described above in detail, it will be understood that numerous modifications might be resorted to without departing from the scope of the invention as defined in the following claims.

I claim:

1. A railroad freight car consisting of the combination of a frame and a permanent body including at least one cargo container;

means mounting the container on the frame in a normal longitudinally aligned relation therewith, said mounting means including pivot means connecting one end of the container to the frame for swinging movement about a vertical axis and for limited rocking movement in a direction transverse to the axis;

a loading opening in the end of the container opposite to the end pivotally connected to the frame;

fixed supporting means carried by the frame for engagement with the container adjacent the loading end thereof to prevent swinging movement about said axis comprising at least a pair of upwardly projecting members carried by said frame, and sockets on the underside of the container adapted to be engaged by the upper portion of said members;

roller supporting means carried by the frame for engagement with the underside of the container adjacent the loading end thereof;

means for vertically moving one of said supporting means relative to the other to transfer the support of the loading end of the container from one supporting means to the other, such relative movement being accompanied by rocking movement of the container transverse to the pivot axis, said means for relatively moving the fixed and roller supporting means comprising jack means for moving the roller supporting means upwardly into engagement with the undersurface of the container to raise the loading end thereof out of engagement with said fixed supporting members; and means for swinging the container about the pivot axis on said roller supporting means from a normal longitudinally aligned position relative to the frame to an angular position in which the loading opening of the container is accessible from a loading platform alongside of the car, said pivot means being so located relative to the frame and the pivoted end of the container that the side of a container opposite the loading platform does not project into interfering relation with movement of another freight car on an adjacent track when the container is swung to an angular position for loading or unloading.

2. A railroad freight car according to claim 1 wherein said container mounting means further includes roller means interposed between said frame and container on either side of said pivot axis in a direction transversely of the frame.

References Cited by the Examiner

UNITED STATES PATENTS

| | | | |
|---|---|---|---|
| 1,271,812 | 7/1918 | Wagner | 105—368 |
| 1,734,303 | 11/1929 | Ross | 105—368 |
| 1,989,920 | 2/1935 | Fildes | 105—366 |
| 2,246,543 | 6/1941 | Smith | 105—368 |
| 2,883,945 | 4/1959 | Walker | 105—368 |
| 3,028,023 | 4/1962 | Eckersall | 105—366 |
| 3,095,987 | 7/1963 | Sable | 105—368 |
| 3,149,583 | 9/1964 | Morrill | 105—455 |

ARTHUR L. LA POINT, *Primary Examiner.*

LEO QUACKENBUSH, *Examiner.*